United States Patent
Brenk et al.

(10) Patent No.: US 6,764,058 B1
(45) Date of Patent: Jul. 20, 2004

(54) CONTROL VALVE AND FUEL INJECTION VALVE PROVIDED WITH SAME

(75) Inventors: Achim Brenk, Kaempfelbach-Bilfingen (DE); Wolfgang Klenk, Loechgau (DE); Uwe Gordon, Markgroeningen (DE); Manfred Mack, Altheim (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 09/889,308

(22) PCT Filed: Nov. 10, 2000

(86) PCT No.: PCT/DE00/04012

§ 371 (c)(1),
(2), (4) Date: Oct. 22, 2001

(87) PCT Pub. No.: WO01/36812

PCT Pub. Date: May 25, 2001

(30) Foreign Application Priority Data

Nov. 15, 1999 (DE) ........................ 199 54 864

(51) Int. Cl.$^7$ ............................................. F16K 31/12
(52) U.S. Cl. ........................................... 251/54; 251/48
(58) Field of Search ........................... 251/48; 123/297, 123/90.11

(56) References Cited

U.S. PATENT DOCUMENTS

| | | | | |
|---|---|---|---|---|
| 4,700,678 A | * | 10/1987 | Elliott | 123/297 |
| 5,019,119 A | * | 5/1991 | Hare, Sr. | 123/500 |
| 5,063,898 A | * | 11/1991 | Elliott | 123/297 |
| 5,103,779 A | * | 4/1992 | Hare, Sr. | 123/90.11 |
| 5,259,487 A | * | 11/1993 | Petek | 188/267.1 |
| 5,588,509 A | * | 12/1996 | Weitzenhof et al. | 188/267.1 |

FOREIGN PATENT DOCUMENTS

| | | | | |
|---|---|---|---|---|
| DE | 19735232 A | * | 2/1999 | |
| EP | 0342882 A | * | 11/1989 | |

* cited by examiner

Primary Examiner—John Bastianelli
(74) Attorney, Agent, or Firm—Ronald E. Greigg

(57) ABSTRACT

A control valve and a fuel injection valve provided with same should be produced, in which it is possible to switch from a first operating state to a second operating state inexpensively and with short switching times, without requiring a hydraulic control line. To this end, a control valve is provided, which has a valve housing, a pressure chamber filled with electrorheological fluid, a displacing element that can slide in the valve housing and protrudes into the pressure chamber, and two electrodes that can apply an electrical field to the electrorheological fluid.

25 Claims, 6 Drawing Sheets

US 6,764,058 B1

CONTROL VALVE AND FUEL INJECTION VALVE PROVIDED WITH SAME

CROSS-REFERENCE TO RELATED APPLICATIONS

This application is a 35 USC 371 application of PCT/DE 00/04012 filed on Nov. 10, 2000.

BACKGROUND OF THE INVENTION

1. Field of the Invention

The invention relates to a control valve and a fuel injection valve provided with same.

2. Description of the Prior Art

A fuel injection valve is disclosed in DE 197 35 232 in which a damping chamber is provided, which can damp an opening motion of the nozzle needle of the injection valve. The damping chamber is filled with an electrorheological fluid and has an outlet around which two electrodes are disposed. By applying an electric field to the electrorheological fluid in the vicinity of the electrodes, the viscosity of the fluid there can be varied. Correspondingly, the flow resistance changes, which counteracts an escape of the electrorheological fluid from the damping chamber and consequently counteracts an opening of the nozzle needle. In this manner, by suitably producing the electrical field between electrodes as a function of operating parameters of an internal combustion engine in which the injection valve is used, influence can be exerted on the injection behavior of the injection valve.

SUMMARY OF THE INVENTION

The object of the invention is comprised in producing a control valve in which different injection cross sections can be produced in a fuel injection valve.

A control valve according to the invention makes it possible to slow or completely inhibit the movement of the displacing element in a virtually arbitrary manner after it travels a particular distance. In this way, the opening behavior of the nozzle needle of a fuel injection valve can be influenced in the desired manner, either directly or indirectly, for example by means of an interposed fluid chamber, without requiring an additional hydraulic control line; only one electrical connection is required for triggering the control valve according to the invention.

According to one embodiment of the invention, the displacing element is a plunger rod which protrudes into the pressure chamber. In this embodiment, when the plunger rod is displaced, only a very slight volume of electrorheological fluid is displaced. For this reason, it is no longer necessary for there to be a buffer chamber with a variable volume which receives the displaced volume; solely the compressibility of the electrorheological fluid makes the corresponding volume displacement possible.

In another embodiment of the invention, the displacing element is provided with a piston which closes the pressure chamber at one end, a buffer chamber is formed on the rear end of the piston, and the pressure chamber is connected to the buffer chamber by means of an overflow conduit. With this embodiment, when there is a small movement of the displacing element, a comparatively large volume of electrorheological fluid is displaced because the piston acts more or less as a booster. Conversely, this means that a relatively small flow resistance and attendant relatively low compressive forces in the electrorheological fluid suffice to produce a high resistance force counter to the movement of the displacing element.

A fuel injection valve according to one embodiment of the invention offers the advantage that a switching between different operating states can be achieved for a low cost, in particular without a separate hydraulic control line. In particular, the electrically switchable control valve makes it possible to brake or stop an opening stroke of the nozzle needle in a virtually arbitrary manner. This is particularly advantageous when the injection valve provides injection orifice selectability so that by selecting the opening stroke, different injection cross sections can be used.

BRIEF DESCRIPTION OF THE DRAWINGS

The invention will be explained in detail below in conjunction with the accompanying drawings, in which.

DESCRIPTION OF THE PREFERRED EMBODIMENTS

Figure 1:
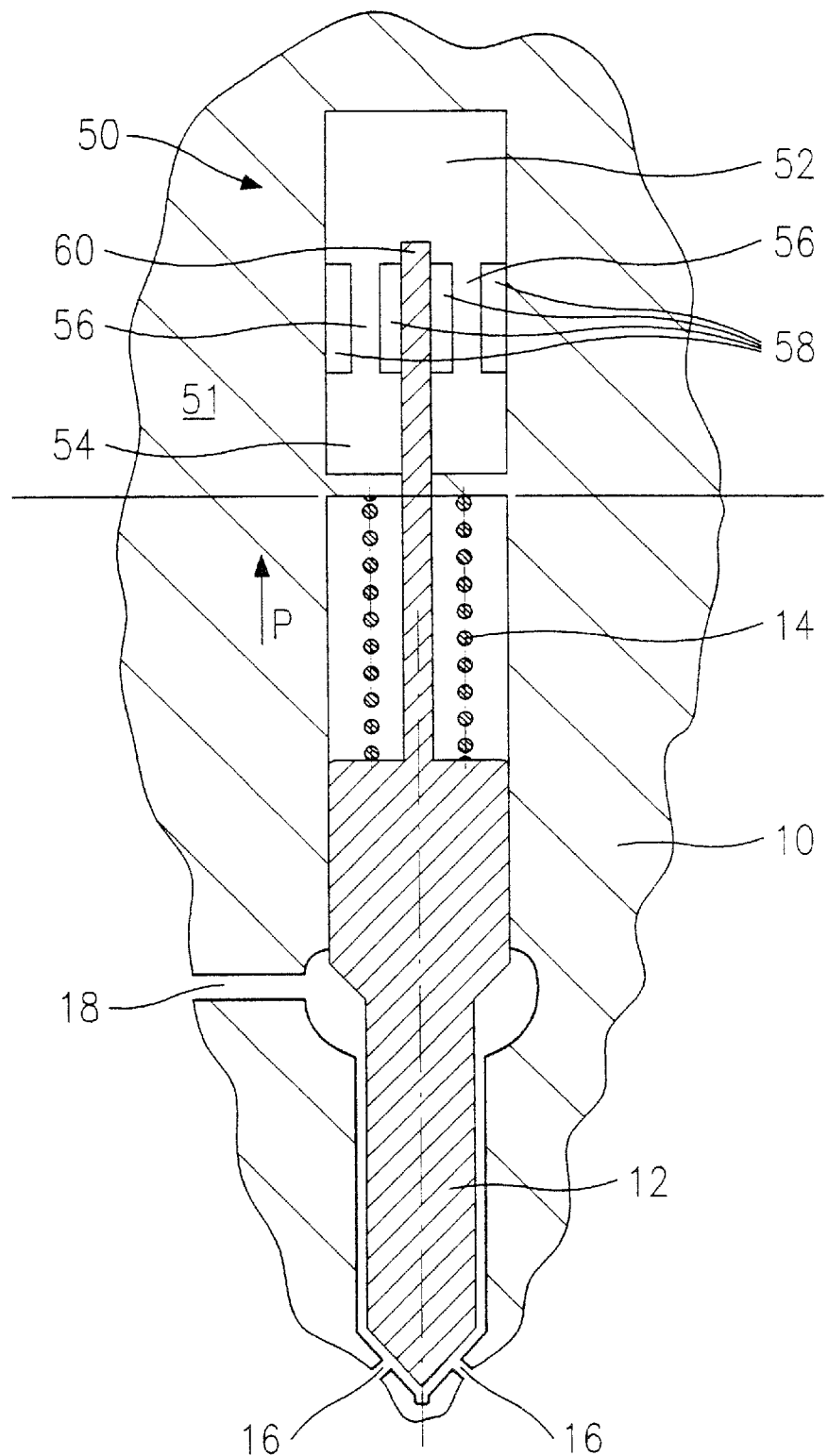
FIG. 1 shows a schematic, sectional view of a fuel injection valve according to the invention, with a control valve according to a first embodiment of the invention.

FIG. 1 shows a fuel injection valve with a control valve according to a first exemplary embodiment of the invention. The injection valve includes a nozzle housing 10, which contains a nozzle needle 12 that can be moved counter to the action of a restoring spring 14. The nozzle housing 10 contains injection orifices 16 for the fuel to be injected, which is supplied by means of a supply line 18. The fuel can emerge from the injection orifices 16 as soon as the nozzle needle, starting from its rest position in which it closes the injection orifices, has executed an opening stroke in the direction of the arrow P. This opening motion can be produced in various ways; the corresponding devices and processes are well known to the specialist in the field of fuel injection systems and are also not the subject of the invention, so they are not discussed further here.

The fuel injection valve is provided with a control valve 50 that has a valve housing 51 which contains a pressure chamber 52 and a buffer chamber 54 connected to the pressure chamber via overflow conduits 56. The pressure chamber, the buffer chamber, and the overflow conduits are filled with an electrorheological fluid, i.e. a fluid whose viscosity can be locally influenced through the application of an electrical field. Electrodes 58 are disposed in the vicinity of the overflow conduits 56 and can produce an electrical field which passes through the electrorheological fluid in each overflow conduit.

From outside the control valve 50, a displacing element 60 protrudes through the buffer chamber into the pressure chamber 52. The displacing element 60 is embodied here as a plunger rod which is connected to the nozzle needle 12. Consequently, an opening motion of the nozzle needle 12 causes the displacing element 60 to be slid into the pressure chamber 52, as a result of which a volume of electrorheological fluid is displaced from the pressure chamber 52, through the overflow conduits 56, into the buffer chamber 54. The buffer chamber 54 can easily receive this additional volume due to the compressibility of the electrorheological fluid.

If no electrical field is present in the overflow conduits 56, by overcoming a comparatively low flow resistance, the electrorheological fluid can be displaced from the pressure chamber 52 into the buffer chamber 54 when the nozzle needle 12 executes an opening motion and thereby the displacing element 60 is slid into the pressure chamber 52. In order to influence the opening motion of the nozzle needle 12, however, control electronics (not shown) can produce an electrical field in the vicinity of the overflow conduits 56 at a desired time. This results in a sharp increase in the viscosity so that a high resistance is produced, counteracting a displacement of a volume of the electrorheological fluid from the pressure chamber 52 into the buffer chamber 54. This can go so far as to prevent a volume displacement by means of the overflow conduits. In this manner, the opening movement of the nozzle needle 12 can be braked or even stopped at a desired time simply by virtue of an electric field being generated in the vicinity of the overflow conduits 56.

Consequently, the electrorheological fluid in the electrical field functions like an adjustable throttle, which can also be completely closed as needed and therefore assumes the function of a valve. A hydraulic stroke stop can thus be produced, whose magnitude and rigidity determines the end position of the nozzle needle in the opening stroke.

As an alternative to the overflow conduits 56 shown, an annular gap can also be used when an inner annular electrode and an outer annular electrode are used, the outer electrode being spaced apart from and encompassing the inner electrode.

Figure 2:
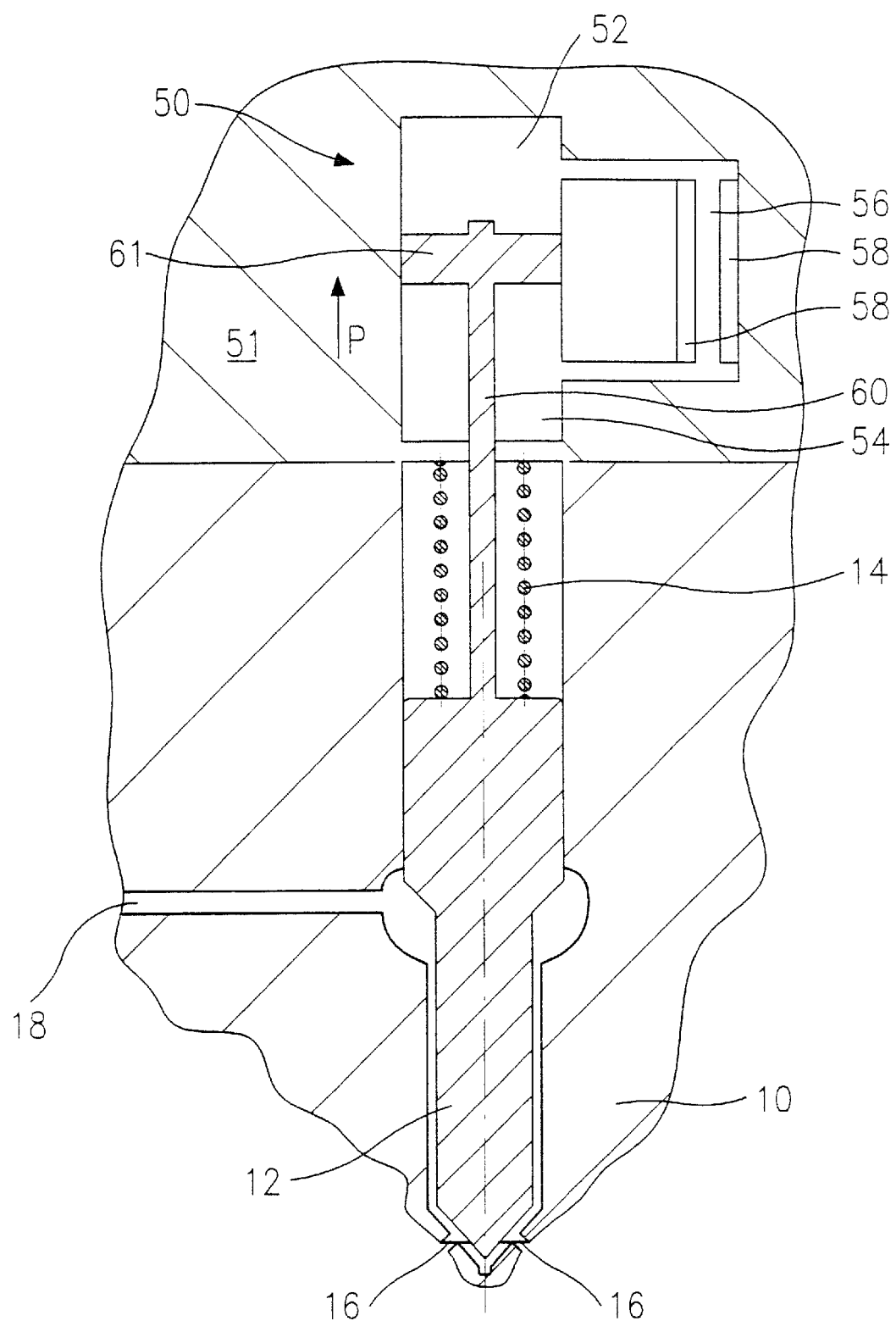
FIG. 2 shows a schematic, sectional view of a fuel injection valve according to the invention, with a control valve according to a second embodiment.

FIG. 2 shows a fuel injection valve with a control valve according to a second embodiment of the invention. When components are used in this embodiment which are known from the first embodiment, the same reference numerals are used. Please refer to the explanations made above with regard to their function.

In contrast to the first exemplary embodiment, in this instance, a piston 61 is embodied on the displacing element 60 and separates the pressure chamber 52 from the buffer chamber 54. In this embodiment, the overflow conduit 56 is embodied in the valve housing 51 and, in the same way as the prior embodiment, contains two electrodes 58, in order to produce an electrical field in the vicinity of the overflow conduit.

With an opening motion of the nozzle needle 12, the piston 61 displaces a volume of electrorheological fluid from the pressure chamber 52, through the overflow conduit, and into the buffer chamber 54. The buffer chamber increases in size according to the movement of the piston so that only the volume displaced by the sliding of the displacing element 60 into the control valve must be accounted for by means of the elasticity and/or compressibility of the electrorheological fluid.

In the fuel injection valve according to the second embodiment, the opening behavior of the nozzle needle 12 can be influenced in the same way as in the first embodiment by the resistance that opposes a volume displacement between the pressure chamber 52 and the buffer chamber 54 due to the viscosity of the electrorheological fluid in the region between the two electrodes 58.

Figure 3:
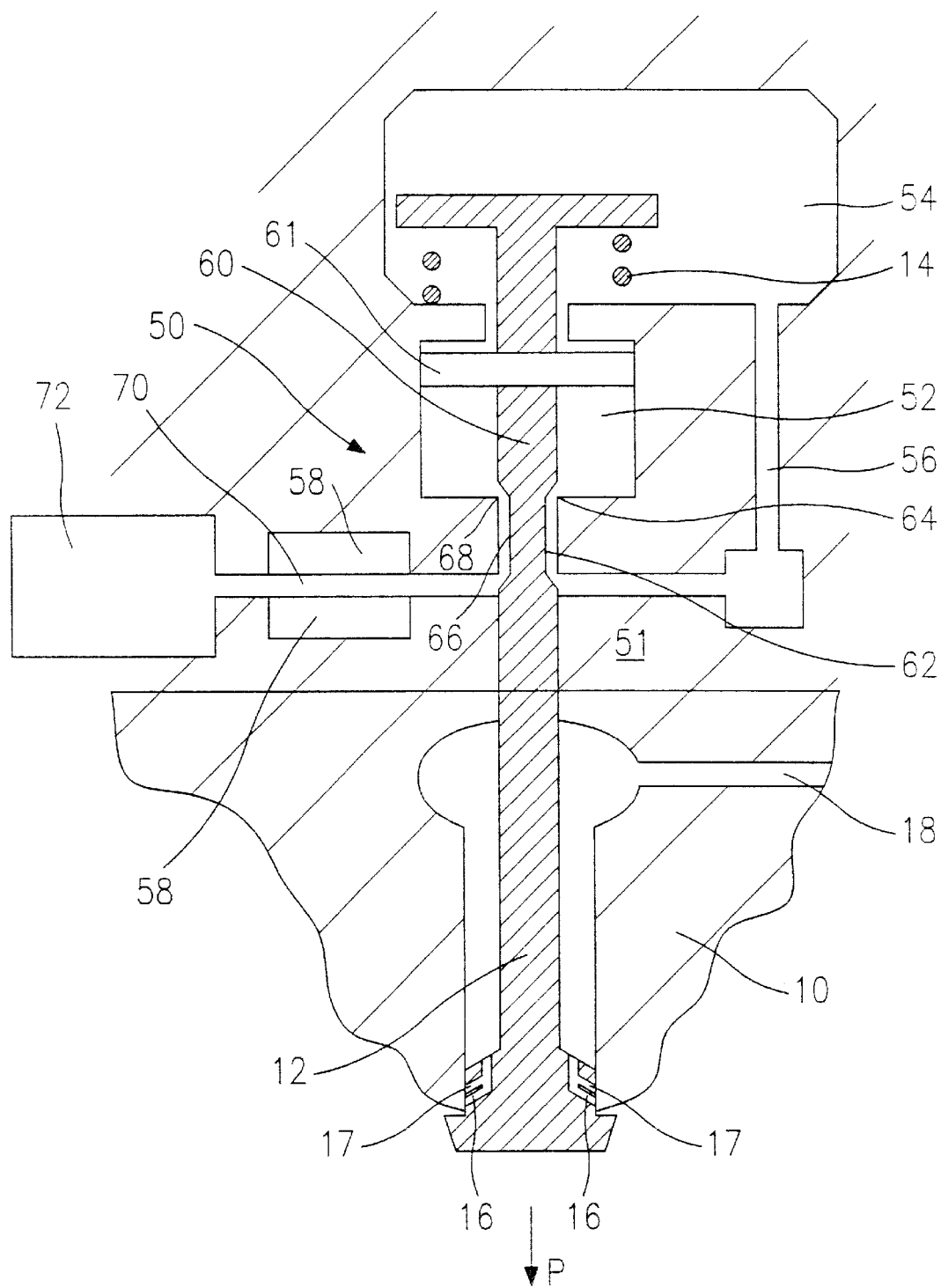
FIG. 3 shows a schematic, sectional view of a fuel injection valve according to the invention, with a control valve according to a third embodiment.

FIG. 3 shows a fuel injection valve with a control valve according to a third embodiment of the invention. The same reference numerals are used for components which are known from the foregoing embodiments and reference is made to the explanations made above.

In contrast to the injection valves according to the first and second embodiments, in which the opening motion of the nozzle needle is directed toward the interior of the housing (inward opening valve), the injection valve according to the third embodiment has a design in which, in order to open the injection orifices, the nozzle needle is moved outward in the housing (outward opening valve).

On its front end, in addition to the injection orifices 16 that are disposed along a circle on the same level, the nozzle needle 12 is provided with injection orifices 17 which are likewise disposed along a circle. The injection orifices 17 are disposed further inside the nozzle housing 10 than the injection orifices 16 so that with an opening stroke of the nozzle needle, the injection orifices 16 are opened first and the injection orifices 17 are opened next.

In this embodiment as well, a piston 61 is used, which cooperates with the displacing element 60 embodied as a plunger rod, which is an extension of the nozzle needle 12. The piston 61 displaces a fluid from the pressure chamber 52, through the overflow conduit 56, and into a buffer chamber 54 which in this embodiment, also contains the restoring spring 14.

The displacing element 60 is provided with a first control groove 62, which cooperates with a control edge 64 on the housing 10. The control groove 62 permits a connection from the pressure chamber 52 to the overflow conduit 56 as long as the control edge 64 is not resting against the displacing element, i.e. starting from its rest position shown in FIG. 3, this displacing element has not traveled a distance which corresponds to the distance measured in the axial direction between the control edge 64 and the end of the control groove 62 oriented toward the pressure chamber.

On the displacing element 60, there is a second control groove 66 which cooperates with a second control edge 68 in the housing. The second control groove 66 is not connected to the first control groove 62 and is offset from it in such a way that its end oriented toward the control edge 68 protrudes further into the pressure chamber 52 than the end of the first control groove 62 oriented toward the first control edge 64.

The second control groove 66 permits a connection between the pressure chamber 52 and a collecting conduit 70, which leads to a collecting chamber 72. The two electrodes 58 which can generate an electrical field are disposed on the collecting conduit 70.

The above-described injection valve operates in the following manner: during a first phase of the opening motion of the nozzle needle 12, the piston 61—particularly by means of the open control groove 62—displaces a volume of electrorheological fluid from the pressure chamber 52, through the overflow conduit 56, and into the buffer chamber 54. As soon as the end of the first control groove 62 meets the control edge 64, this displacement of fluid into the buffer chamber 54 is no longer possible. The control groove 62 is embodied so that it is closed by the first control edge 64 after a stroke that is sufficient to open the first injection orifices 16.

After this first stroke, the electrorheological fluid can leave the pressure chamber 52 only via the second control groove 66, and can only travel toward the collecting chamber 72. This displacement of the fluid can be influenced by the two electrodes 58 which, when necessary, can produce such a high flow resistance of the electrorheological fluid that it amounts to a closed second control groove. This means that it is not possible for the nozzle needle 12 to execute a further opening stroke into a position in which the second injection orifices 17 are opened.

By contrast, if the second injection orifices 17 need to be used in addition to the first injection orifices 16, then the electrodes 58 are not actuated so that the piston 61 can displace the electrorheological fluid from the pressure chamber 52, via the second control groove 64 and the collecting conduit 70, and into the collecting chamber 72 so that it is possible for the nozzle needle 12 to execute an opening stroke into a position in which both rows of injection orifices 16, 17 are used.

It is common to all of the embodiments described above that the electrorheological fluid was displaced directly by a component connected to the nozzle needle, namely the displacing element 60 and/or the piston 61, when the nozzle needle had executed an opening stroke. Consequently, the opening stroke of the nozzle needle could be influenced because an influence was exerted on the flow resistance opposing a displacement of a volume of electrorheological fluid.

The first and second embodiment have in common the fact that an activation of the electrodes of the control valve must occur whenever the opening stroke of the nozzle needle is to be stopped. In contrast to this, in the third embodiment, a choice can be made from the start as to whether it should be possible for the nozzle needle of the injection valve to open with only a first stroke or with a larger second stroke. If an opening with only a first stroke is desired, then the electrodes remain permanently activated; in contrast to the first and second embodiment, namely, this state still permits a limited opening of the nozzle needle.

In the first and second embodiment, it is also possible to damp the opening stroke of the nozzle needle by means of the throttle action produced in the region of the overflow conduit so that a slower increase of the injection rate is produced. The changing of the viscosity of the electrorheological fluid in this connection occurs within such a short time that the needle damping can be changed even during the opening phase of the nozzle needle.

Figure 4:
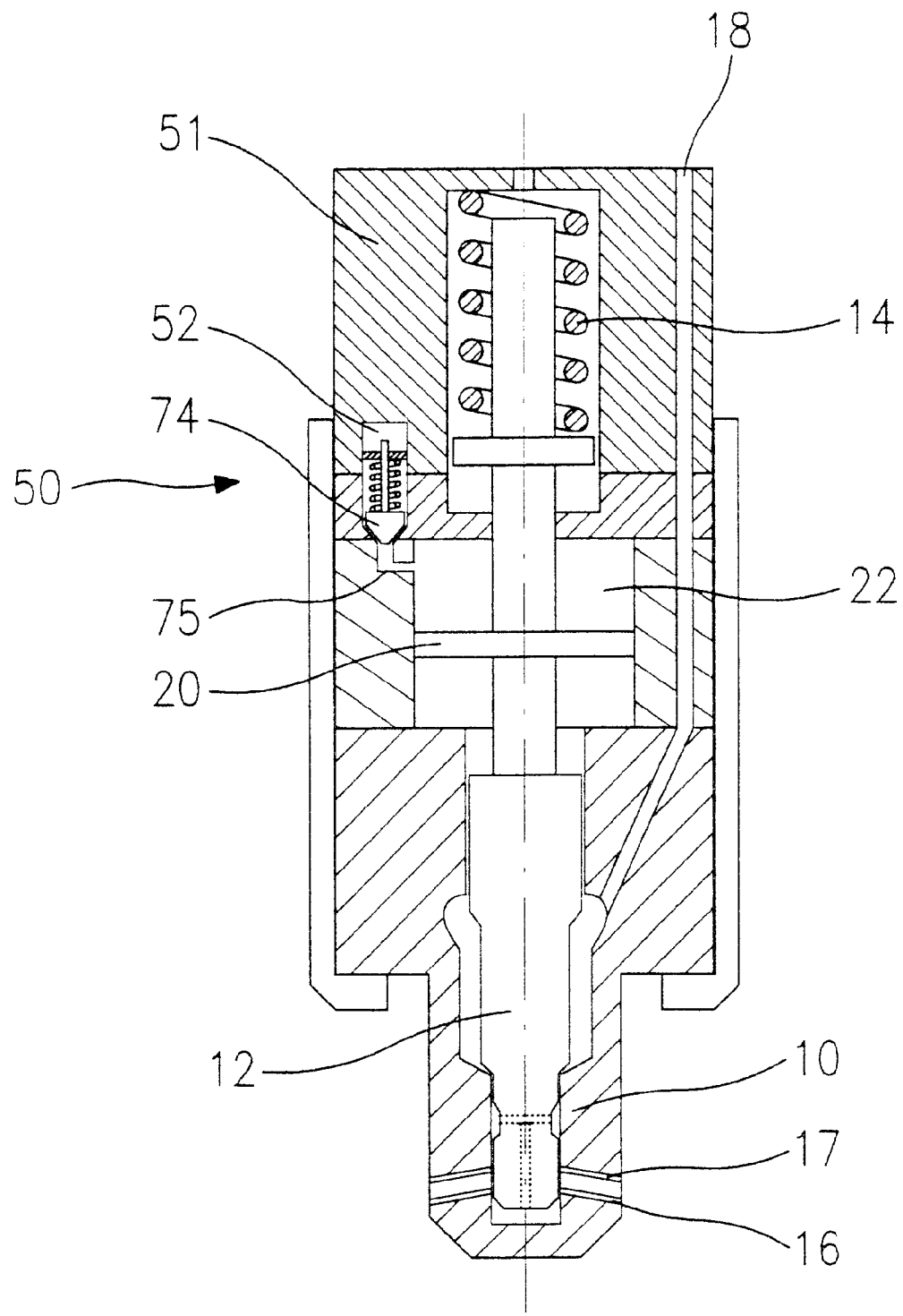
FIG. 4 shows a schematic, sectional view of a fuel injection valve according to the invention, with a control valve according to a fourth embodiment.

FIG. 4 shows a fuel injection valve with a control valve according to a fourth embodiment of the invention. In this embodiment as well, components which are known from the foregoing embodiments are given the same reference numerals and reference is made to the explanations above.

Like the first and second embodiments, the embodiment from FIG. 4 is a so-called inwardly opening injection valve, i.e. an injection valve in which in order to open, the nozzle needle must execute an opening stroke that is directed toward the interior of the nozzle housing 10. The nozzle needle 12 is connected to a sliding element 20 in the form of a piston, which can be slid in a fluid chamber 22 that is filled with fuel.

Figure 5:
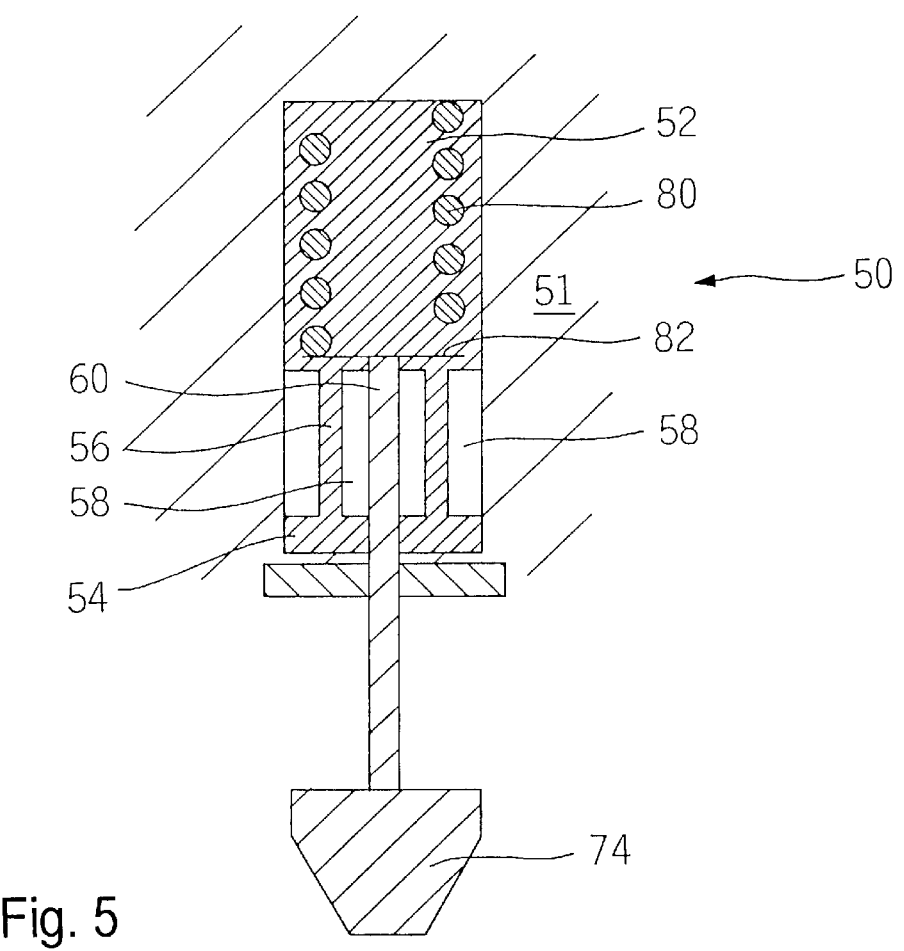
FIG. 5 shows an enlarged schematic, sectional view of the control valve used in the fuel injection valve from FIG. 4.

An outlet conduit 75 branches off from the fluid chamber 22 and leads to the control valve 50. This control valve is only schematically depicted in FIG. 4; the precise design is shown in FIG. 5. The control valve 50 has a valve element 74 in the form of a cone, which can open or close the outlet conduit 75. The valve element 74 is connected to the displacing element 60, which is once again embodied as a plunger rod. The displacing element is disposed so that in order to lift the valve element, it must plunge further into the pressure chamber 52. In a manner comparable to the design known from FIG. 1, the opposing resistance is based on the fact that a variable resistance can be produced to counteract a displacement of a volume of electrorheological fluid from the pressure chamber 52, through the overflow conduit 56, and into the buffer chamber 54. In contrast to the embodiment of the control valve according to FIG. 1, in this embodiment, a compression spring 80 is provided, which is disposed inside the pressure chamber 52, is supported on the displacing element 60 by a spring plate 82, and pushes the valve element 74 into the position that closes the outlet conduit 75.

It functions as follows: if the electrodes 58 are not activated and the displacing element 60 can therefore be slid into the pressure chamber 52, then there is a comparatively large volume which can receive the fluid that is displaced by the sliding element 20 with an opening stroke of the nozzle needle 12. This results in a comparatively low rigidity of the hydraulic system involved in the displacement of fluid from the fluid chamber 22, which permits the nozzle needle 12 to execute an opening stroke into a position in which both the injection orifices 16 of the first row and the injection orifices 17 of the second row are opened. By contrast, if the electrodes 58 are activated, then the valve element 74 cannot be lifted up from the outlet conduit 75. As a result, there is a comparatively small volume for the hydraulic system, which is relevant for a displacement of fluid by the sliding element 20, and there is consequently a comparatively high rigidity of this hydraulic system, so that a pressure builds up in the fluid chamber 22 such that only a short opening stroke of the nozzle needle is possible. This can occur through selective activation of the electrodes if the nozzle needle 12 has executed enough of an opening stroke for just the first row of injection orifices 16 to open while the second row of injection orifices 17 remains closed. The switching times for switching the control valve between a state in which the outlet conduit 75 is open and a state in which the outlet conduit is closed are on an order of magnitude of less than one millisecond so that it is possible to switch between the different states during operation.

Figure 6:
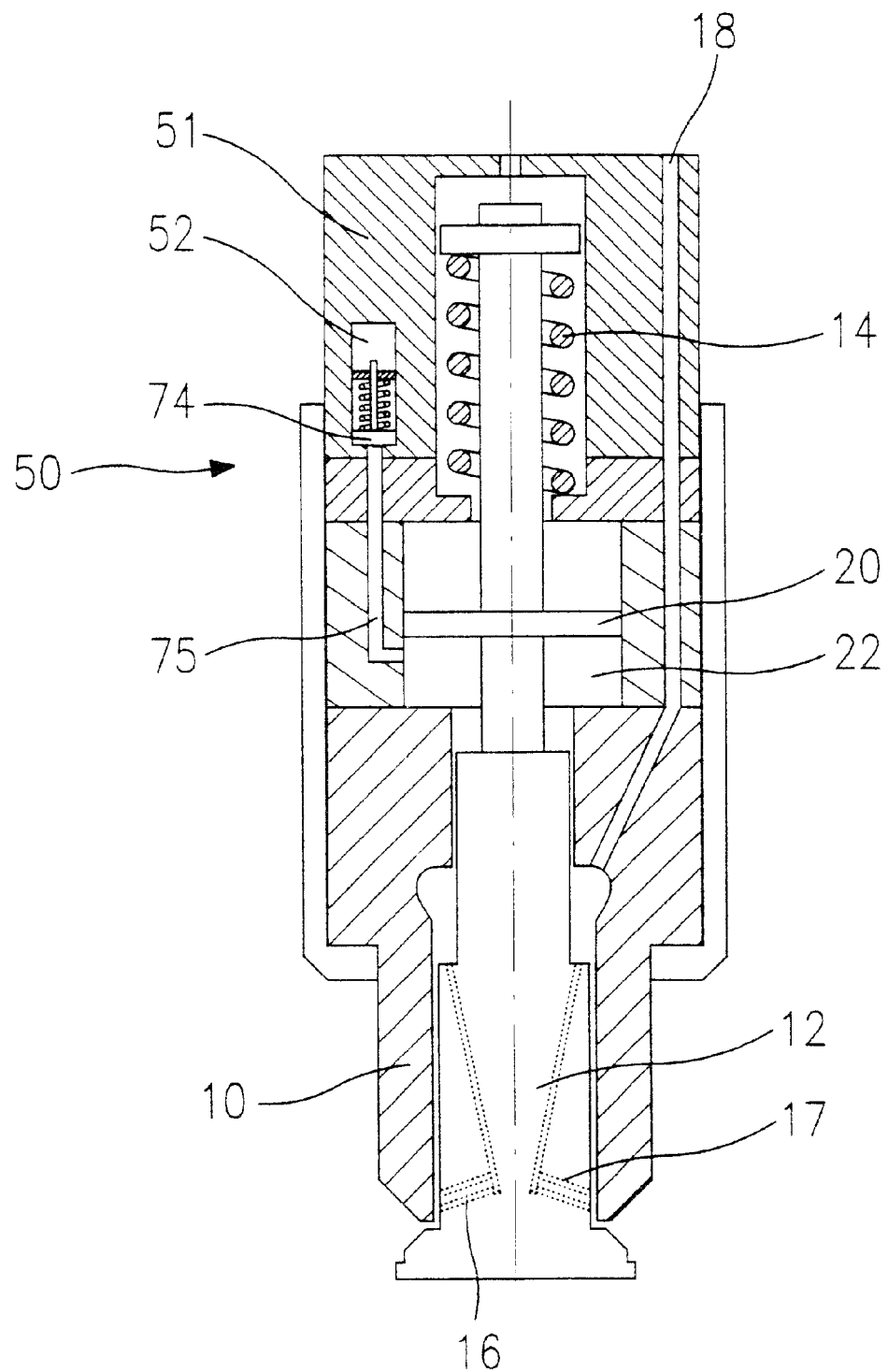
FIG. 6 shows a schematic, sectional view of a fuel injection valve according to the invention, with a control valve according to a fifth embodiment.

FIG. 6 shows a fuel injection valve with a control valve according to a fifth embodiment of the invention. In this embodiment as well, components which are known from the foregoing embodiments are provided with the same reference numerals and reference is made to the explanations made there.

Figure 7:
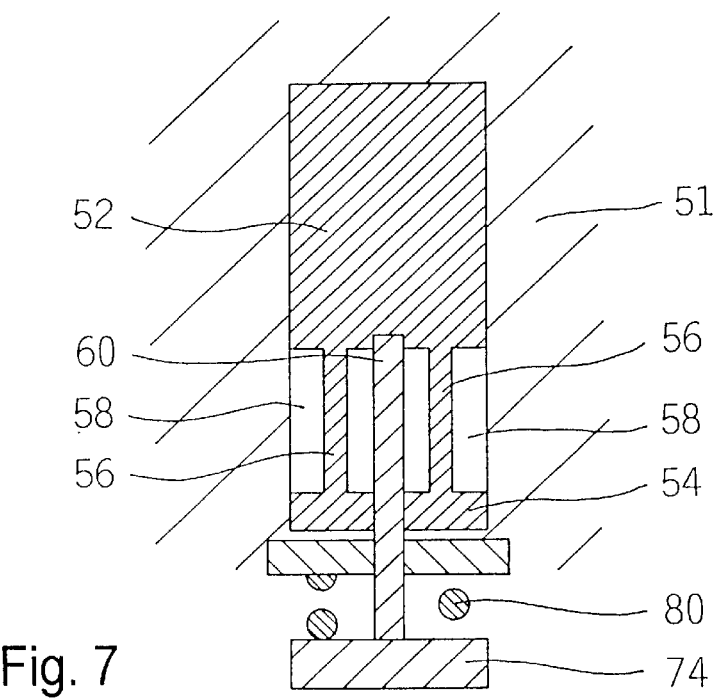
FIG. 7 shows an enlarged schematic, sectional view of the control valve used in the fuel injection valve from FIG. 7.

Similar to the third embodiment, this is an outwardly opening injection valve, i.e. an injection valve in which the nozzle needle executes an opening stroke which is oriented toward the outside of the nozzle housing 10. Here, too, the nozzle needle 12 is provided with two rows of injection orifices 16, 17, which are opened depending on the magnitude of the opening stroke. The control valve, which is used in the fuel injection valve according to the fifth embodiment, is only schematically depicted in FIG. 6, and is shown in detail in FIG. 7, has a valve element 74 which cooperates with an outlet conduit 75 of a fluid chamber 22. Similar to the embodiment shown in FIG. 4, the valve element 74, by opening or closing the outlet conduit, serves to vary the rigidity of the hydraulic system, which counteracts a movement of the sliding element 20. In contrast to the control valve shown in FIG. 5, the compression spring 80 is disposed outside the pressure chamber 52.

The control valves that are used in the third, fourth, and fifth embodiments have in common the fact that only a very small volume is filled with electrorheological fluid. This small volume of electrorheological fluid serves merely to control the switching motion of a valve element. The actual reaction on the nozzle needle 12 is produced by a fluid which is separate from the electrorheological fluid and is preferably the fuel to be injected by the injection valve.

A particular advantage of the control valve according to the invention lies in the fact that only a very small quantity of energy is required for switching. This energy quantity can be drawn from the electrical energy supply of a vehicle and is, moreover, largely recovered after the switching event.

The foregoing relates to preferred exemplary of embodiments of the invention, it being understood that other variants and embodiments thereof are possible within the spirit and scope of the invention, the latter being defined by the appended claims.

We claim:

1. A fuel injection valve comprising a nozzle housing (10), a nozzle needle (12), a supply line (18) for supplying fluid into the nozzle housing (10), and a control valve (50),
    the nozzle housing (10) containing injection orifices (16) for the fuel to be injected,
    the nozzle needle (12) being capable of sliding in the nozzle housing (10) and being biased into a rest position in which it closes the injection orifices (16),
    the control valve (50) including a valve housing (51), a pressure chamber (52), a displacing element (60), and two electrodes (58),
    the pressure chamber (52) being filled with an electrorheological fluid,
    the displacing element (60) being supported for movement in the valve housing (51) and protruding into the pressure chamber (52) and being coupled to the nozzle needle (12),
    the electrodes (58) being adapted to apply an electrical field to the electrorheological fluid.

2. A control valve according to claim 1 wherein one of the electrodes (58) is disposed on one side of the pressure chamber (52).

3. The control valve according to claim 2 wherein the displacing element (60) is a plunger rod which protrudes into the pressure chamber (52).

4. The control valve according to claim 3 wherein the displacing element (60) is provided with a valve element (74) and wherein a compression spring (80) is provided, which pushes the valve element away from the pressure chamber.

5. The control valve according to claim 2 wherein the pressure chamber (52) is provided with at least one overflow conduit (56) and the electrodes are disposed in the vicinity of this overflow conduit.

6. The control valve according to claim 2 wherein the displacing element is provided with a piston (61) which closes the pressure chamber (52) at one end, wherein a buffer chamber (54) is formed on the rear end of the piston, and wherein the pressure chamber is connected to the buffer chamber by means of an overflow conduit (56).

7. The control valve according to claim 2 wherein the displacing element is provided with a piston (61) which closes the pressure chamber (52) at one end, wherein a buffer chamber (54) is formed on the rear end of the piston, and wherein the pressure chamber is connected to the buffer chamber by means of an overflow conduit (56).

8. The control valve according to claim 1 wherein the displacing element (60) is a plunger rod which protrudes into the pressure chamber (52).

9. The control valve according to claim 8 wherein the displacing element (60) is provided with a valve element (74) and wherein a compression spring (80) is provided, which pushes the valve element away from the pressure chamber.

10. The control valve according to claim 9 wherein the compression spring (80) is disposed in the pressure chamber (52).

11. The control valve according to claim 10 wherein the pressure chamber (52) is provided with at least one overflow conduit (56) and the electrodes are disposed in the vicinity of this overflow conduit.

12. The control valve according to claim 8 wherein the pressure chamber (52) is provided with at least one overflow conduit (56) and the electrodes are disposed in the vicinity of this overflow conduit.

13. The control valve according to claim 1 wherein the pressure chamber (52) is provided with at least one overflow conduit (56) and the electrodes are disposed in the vicinity of this overflow conduit.

14. The control valve according to claim 13 wherein the overflow conduit (56) is constituted by an annular gap between the two electrodes (58).

15. The control valve according to claim 1 wherein the displacing element is provided with a piston (61) which closes the pressure chamber (52) at one end, wherein a buffer chamber (54) is formed on the rear end of the piston, and wherein the pressure chamber is connected to the buffer chamber by means of an overflow conduit (56).

16. The control valves according to claim 15 wherein the electrodes (58) are disposed on the overflow conduit.

17. The control valve according to claim 16 wherein the displacing element (60) is provided with a first control groove (62) which is disposed so that it closes an outlet from the pressure chamber (52) after a first stroke of the displacing element (60), wherein the displacing element (60) is provided with a second control groove (66), which connects the pressure chamber to a collecting conduit (70) that leads to a collecting chamber (72), and wherein the electrodes (58) are disposed on the collecting conduit (70).

18. The control valve according to claim 15 wherein the displacing element (60) is provided with a first control groove (62) which is disposed so that it closes an outlet from the pressure chamber (52) after a first stroke of the displacing element (60), wherein the displacing element (60) is provided with a second control groove (66), which connects the pressure chamber to a collecting conduit (70) that leads to a collecting chamber (72), and wherein the electrodes (58) are disposed on the collecting conduit (70).

19. The control valve according to claim 1 wherein the displacing element is provided with a piston (61) which closes the pressure chamber (52) at one end, wherein a buffer chamber (54) is formed on the rear end of the piston, and wherein the pressure chamber is connected to the buffer chamber by means of an overflow conduit (56).

20. For a fuel injection valve including a nozzle housing (10), a nozzle needle (12), a supply line (18) for supplying fluid into the nozzle housing (10), the nozzle housing (10) containing injection orifices (16) for the fuel to be injected, the nozzle needle (12) being capable of sliding in the nozzle housing (10) and being biased into a rest position in which it closes the injection orifices (16),
    a control valve (50) comprising a valve housing (51), a pressure chamber (52), a displacing element (60), and two electrodes (58),
    the pressure chamber (52) being filled with an electrorheological fluid,
    the displacing element (60) being supported for movement in the valve housing (51) and protruding into the pressure chamber (52) and being coupled to the nozzle needle (12), the electrodes (58) being adapted to apply an electrical field to the electrorheological fluid.

21. The injection valve according to claim 20 wherein the displacing element (60) of the control valve is coupled to the nozzle needle (12).

22. The control valve according to claim 21 wherein the displacing element (60) is a plunger rod which protrudes into the pressure chamber (52).

23. The injection valve according to claim 20 wherein the nozzle needle (12) is coupled to a sliding element (20) which protrudes into a fluid chamber (22) connected to the outlet conduit (75), and wherein the control valve (50) is associated with this outlet conduit.

24. The control valve according to claim 20 wherein the displacing element (60) is a plunger rod which protrudes into the pressure chamber (52).

25. The control valve according to claim 20 wherein the pressure chamber (52) is provided with at least one overflow conduit (56) and the electrodes are disposed in the vicinity of this overflow conduit.

* * * * *